US012755280B2

(12) United States Patent
Ohtamaa et al.

(10) Patent No.: US 12,755,280 B2
(45) Date of Patent: *Oct. 6, 2026

(54) TRUSTLESS SMART CONTRACT EXECUTION BASED ON PROVABLE ORDERED TRANSACTION HISTORY

(71) Applicant: Market Software Ltd., Gibraltar (GB)

(72) Inventors: Mikko Ohtamaa, Gibraltar (GB); Teemu Sorvisto, Twickenham (GB)

(73) Assignee: Market Software Ltd., Gibraltar (GI)

( * ) Notice: Subject to any disclaimer, the term of this patent is extended or adjusted under 35 U.S.C. 154(b) by 0 days.

This patent is subject to a terminal disclaimer.

(21) Appl. No.: 18/963,945

(22) Filed: Nov. 29, 2024

(65) Prior Publication Data

US 2025/0094974 A1 Mar. 20, 2025

Related U.S. Application Data

(63) Continuation-in-part of application No. 18/765,670, filed on Jul. 8, 2024.

(60) Provisional application No. 63/604,255, filed on Nov. 30, 2023, provisional application No. 63/525,695, filed on Jul. 9, 2023.

(51) Int. Cl.
*G06Q 20/38* (2012.01)
*G06Q 40/04* (2012.01)

(52) U.S. Cl.
CPC ........... *G06Q 20/389* (2013.01); *G06Q 40/04* (2013.01)

(58) Field of Classification Search
CPC ............................. G06Q 20/389; G06Q 20/04
USPC ............................................................ 705/37
See application file for complete search history.

(56) References Cited

U.S. PATENT DOCUMENTS

| | | | |
|---|---|---|---|
| 10,878,415 B1 | 12/2020 | Yang et al. | |
| 11,423,450 B2 | 8/2022 | Preston et al. | |
| 11,934,425 B1 * | 3/2024 | Hall | G06F 16/275 |
| 12,118,127 B1 * | 10/2024 | Cordi | H04L 9/3297 |
| 2017/0308893 A1 | 10/2017 | Saraniecki | |
| 2021/0027369 A1 | 1/2021 | Raheman et al. | |
| 2021/0056628 A1 * | 2/2021 | Jang | G06Q 10/04 |
| 2021/0166313 A1 | 6/2021 | Cho | |
| 2021/0334866 A1 * | 10/2021 | Schneider | G06Q 30/0201 |
| 2022/0318911 A1 * | 10/2022 | Heitkotter | G06Q 40/04 |
| 2023/0136805 A1 * | 5/2023 | Morais | G06Q 20/401 705/75 |
| 2024/0046352 A1 * | 2/2024 | Negron | G06Q 20/389 |
| 2024/0330080 A1 * | 10/2024 | Abdelrahman | H04L 63/1425 |

* cited by examiner

*Primary Examiner* — Courtney P Jones
(74) *Attorney, Agent, or Firm* — Adams Intellex, PLC

(57) ABSTRACT

Data analysis is enabled by trustless decision strategy execution. Programming access is provided to a database which includes a provable ordered transaction history of a tokenized asset. The provable ordered transaction history is based on transactions from one or more blockchains. One or more decision strategies, which comprise a program that activates one or more actions for a smart contract, are developed. A first decision strategy, one or more execution parameters, and one or more protection parameters are selected. The first decision strategy, which initiates a smart contract, is deployed on a public oracle network. One or more action instructions are sent to the smart contract. The one or more action instructions are executed by the smart contract. The executing is trustless, resulting in at least one new blockchain transaction.

26 Claims, 8 Drawing Sheets

TRUSTLESS SMART CONTRACT EXECUTION BASED ON PROVABLE ORDERED TRANSACTION HISTORY

RELATED APPLICATIONS

This application claims the benefit of U.S. provisional patent application "Trustless Smart Contract Execution Based On Transformed Data" Ser. No. 63/604,255, filed Nov. 30, 2023.

This application is also a continuation-in-part of U.S. patent application "Private Oracle-Based Trustless Smart Contract Execution" Ser. No. 18/765,670, filed Jul. 8, 2024, which claims the benefit of U.S. provisional patent applications "History-Based Trustless Smart Contract Execution" Ser. No. 63/525,695, filed on Jul. 9, 2023, and "Trustless Smart Contract Execution Based On Transformed Data" Ser. No. 63/604,255, filed Nov. 30, 2023.

Each of the foregoing applications is hereby incorporated by reference in its entirety.

FIELD OF ART

This application relates generally to data analysis and more particularly to trustless smart contract execution based on provable ordered transaction history.

BACKGROUND

In commerce, the ability to trust a partner, an intermediary, or a customer can be crucial to successfully buying and selling goods and services. In many cultures, a simple gesture, handshake, or spoken word can form a binding contract-a promise that each party will perform their side of an agreement. Some industries thrive on trust-based exchanges. In New York City, the diamond business transacts thousands of dollars' worth of gems on a word and a handshake. This trust is based in religion, immigrant history, and reliability, as well as tradition. Hasidic Jews from all over Eastern Europe brought their business methods and philosophy with them into the 1940s as they fled the growing threat of fascism. Their involvement in the diamond industry dates back to the 15th century, when the Catholic church frowned on handling goods and money, allowing the Jewish community to work and eventually thrive in the business of precious stones.

In other industries, trust is built from fulfilling commitments over time. Manufactured goods that meet or exceed both quality and performance specifications, suppliers that deliver the correct components in the required quantities on time, and workers who complete assignments in good order and with good attitudes all contribute to a sense of trust that leads to additional business and sustained profits. Every business sector contains companies that are known for their trustworthiness. In general, companies that are trusted tend to be older. They have learned the value of doing business with integrity as well as efficiency. Their ability to routinely perform as promised has contributed to their continued success. While this goodwill cannot easily be expressed in terms of dollars and cents, it can easily be observed by those who work in the same industry. Trustworthy businesses generally attract the best people, routinely compensate their employees fairly, and land the most valuable contracts and relationships over time. Trustworthiness can also lead to positive regard and marketing advantages.

Some industries can have greater difficulty garnering trust than others. Political figures and governments in general are routinely thought of as being untrustworthy by many. One or two bad actors from any political party can contribute to doubts both inside and out of their constituencies. Deception and corruption exposed by legal processes and investigations can erode trust and establish negative reputations that can take decades to rebuild. News broadcasters and news sources can be praised by some and vilified by others. As social media and technology expand the ability of anyone with a cell phone, tablet, or computer to contribute their observations and opinions without filters or quality checks, businesses that depend on humans to verify facts have suffered. As artificial intelligence programs refine the ability to swap faces, voices, and actions on video platforms, trust becomes even more difficult to establish and maintain. Computers and digital networks, however, are only tools. They can be used to amplify bad or good behavior. They can be used to help establish trust or to destroy it. Like many other businesses or industries, trustworthy technologies must often depend upon the trustworthiness and integrity of the humans using and controlling them.

SUMMARY

The buying and selling of goods and services has transpired for as long as human civilizations have existed. In its earliest forms, exchanges of goods or services were made directly in face-to-face interactions between individuals and groups. Later on, intermediaries or representatives of individuals or groups wishing to sell or buy all manner of products and services would meet with one side or the other to complete transactions. Eventually, the intermediaries formed common meeting places where goods and services could be exchanged on behalf of buyers and sellers. These meeting places or exchanges evolved to the point that prices could be set based on the volume of many similar transactions involving specific goods and services. Prices became more stable, and currencies or other methods of payment became standardized. In modern times, computers and digital networks carry on the same sort of commercial and private exchanges. While the volume and speed of the transactions is much greater, the basics of the exchanges themselves are essentially the same. However, with the worldwide scope of many commercial exchanges, prices, available items, quantities of the items, etc., can change dramatically in a short time. Thus, a shrewd seller or buyer must keep close track of market trends and volatility. At the same time, while prices and item availability can swing widely and perhaps wildly, even within the short time duration, price and sales trends can be far more informative regarding whether to execute a transaction or not. Instead, collecting information from one or more trusted sources and analyzing the collected data can provide a stronger position regarding whether to execute a transaction or not.

Data analysis is enabled by trustless decision strategy execution. Programming access is provided to a database which includes a provable ordered transaction history of a tokenized asset. The provable ordered transaction history is based on transactions from one or more blockchains. One or more decision strategies, which comprise a program that activates one or more actions for a smart contract, are developed. A first decision strategy, one or more execution parameters, and one or more protection parameters are selected. The first decision strategy, which initiates a smart contract, is deployed on a public oracle network. One or more action instructions are sent to the smart contract. The one or more action instructions are executed by the smart contract. The executing is trustless, resulting in at least one new blockchain transaction.

A processor-implemented method for data analysis is disclosed comprising: providing programming access to a database, wherein the database includes a provable ordered transaction history of a tokenized asset, wherein the provable ordered transaction history is based on a plurality of on-chain transactions from one or more blockchains; developing one or more decision strategies, wherein each decision strategy in the one or more decision strategies is based on the provable ordered transaction history, wherein the one or more decision strategies comprise a program that activates one or more actions for a smart contract; selecting a first decision strategy within the one or more decision strategies, wherein the selecting includes one or more execution parameters and one or more protection parameters; deploying the first decision strategy on a public decentralized oracle network (DON), wherein the first decision strategy initiates the smart contract on the one or more blockchains; sending one or more action instructions, by the first decision strategy running on the public DON, to the smart contract; and executing the one or more action instructions, by the smart contract, wherein the executing results in at least one new blockchain transaction, and wherein the executing is trustless.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
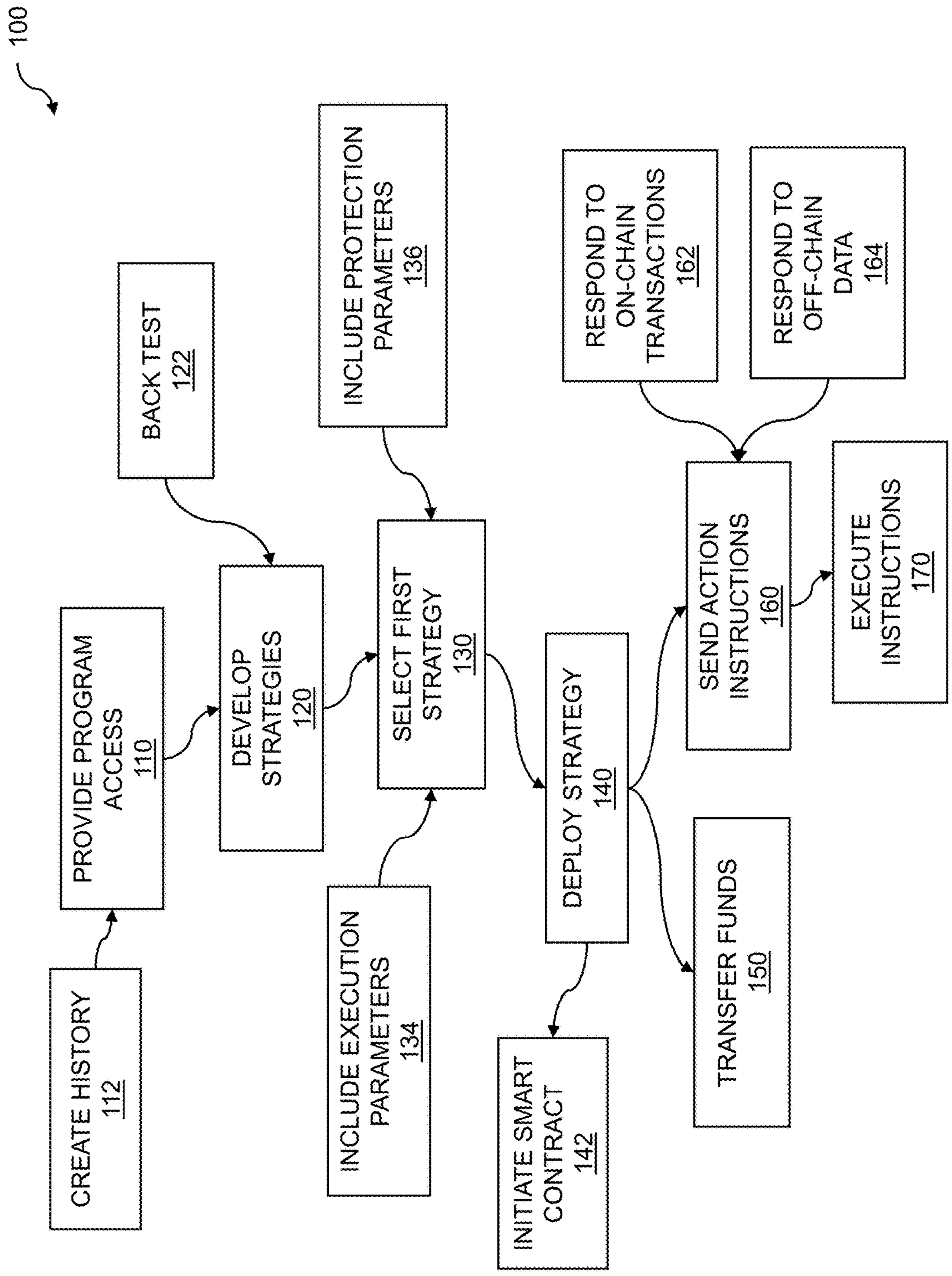
FIG. 1 is a flow diagram for a trustless smart contract execution based on provable ordered transaction history data.

The advent of digital communications has truly made the world a global marketplace. Digital networks have greatly expanded and connected suppliers and consumers. From their homes, buyers can search globally for goods and services online, compare offerings from several sellers, and execute their purchases online. Individual sellers can sell their goods and services to previously inaccessible markets with a simple website. Transactions such as these can routinely be completed based on credit or by digital exchanges of expanding varieties. These new markets have increased opportunity and improved efficiency. However, the advantages of these technologies and marketplaces come with new forms of digital risk. The values of goods and services can be subject to fast-moving price fluctuations. Ownership of a purchase can be questioned. Bad actors can steal credit card information, manipulate prices, and so on. Many marketplaces, such as online shopping sites or security clearinghouses, require a third party to complete the transaction. Often, the buyer does not know the third party and cannot vouch for its trustworthiness. Thus, these transactions come with a certain amount of risk. This situation is compounded when the goods include a digital asset such as a cryptocurrency which can be bought and sold on blockchains with tools that can be manipulated, hacked, and so on. Techniques for protecting transactions with trustless smart contract execution can solve these problems by enabling secure transactions, such as blockchain transactions, between anonymous parties without an unknown or untrusted third party.

Techniques for data analysis are disclosed. Programming access is provided to a database. The database includes a provable ordered transaction history of a tokenized asset. The provable ordered transaction history is based on a plurality of on-chain transactions from one or more blockchains. The provable ordered transaction history can be created based on a combined hash, which is based on one or more blocks from the one or more blockchains. The provable ordered transaction history can include a money flow, a liquidity, a time-ordered transaction history, and so on. One or more decision strategies are developed. Each decision strategy is based on the provable ordered transaction history. The one or more decision strategies comprise a program that activates one or more actions for a smart contract. A first decision strategy is selected. The selecting includes one or more execution parameters and one or more protection parameters. The execution parameters can include a trade dollar limit, a trade quantity limit, a crypto currency trading pair, a time limitation, and so on. The first decision strategy is deployed on a public decentralized oracle network (DON). Funds can be transferred from a blockchain wallet owned by the user, to the smart contract. The first decision strategy initiates the smart contract on the one or more blockchains. One or more action instructions are sent by the first decision strategy running on the public DON, to the smart contract. Each action instruction can comprise a decentralized finance (deFi) transaction. The sending can include validating, by the smart contract, the one or more action instructions. The validating can be based on the one or more protection parameters. The one or more action instructions can be based on the one or more execution parameters. The sending can be responsive to one or more on-chain transactions or off-chain data. The one or more action instructions are executed by the smart contract. The executing results in at least one new blockchain transaction. The executing is trustless. Thus, the new blockchain transaction was executed according to the first decision strategy can be verified.

FIG. 1 is a flow diagram 100 for trustless smart contract execution based on provable ordered transaction history. In trustless smart contract execution, a smart contract enables transactions, such as blockchain transactions, between anonymous parties. The contract execution is trustless since data within the blockchain can be used to confirm that the blockchain is complete, undamaged, and unaltered. The smart contract can be executed on an asset such as a tokenized asset. A tokenized asset can be any digital or real-world asset that is represented by a digital token, such as a blockchain-based token. The blockchain-based token can represent ownership rights of the real-world asset. The asset can include a physical asset such as art, collectibles, real estate, bonds, a cryptocurrency, and so on. The asset can be bought, sold, traded, exchanged, etc. Changes in value of the real asset can be reflected in transactions such as those listed above.

The flow 100 includes providing programming access to a database 110. The database can include a secure database, a controlled access database, and so on. The database can include a central database, a distributed database, etc. Programming access can be provided to a developer. The developer can include an individual developer, a team of developers, and the like. The developer can attain programming access through an interface such as an application programming interface (API). The developer can be granted access using a code, a password, two-factor authentication (2FA), an access control list (ACL), and so on.

The database includes a provable ordered transaction history of a tokenized asset. A tokenized asset can be any digital or real-world asset that is represented by a digital token, such as a blockchain-based token. The blockchain-based token can be bought, sold, traded, exchanged, etc. via one or more blockchain transactions. The blockchain transactions can be executed on a blockchain. A blockchain can be a decentralized ledger of one or more blocks linked together. The blockchain can be a public blockchain or a private blockchain where access is controlled. Blocks within the ledger can contain a header, a hash, data associated with a transaction, and so on. A consensus mechanism can be used to ensure security before data is added to the blockchain. The consensus mechanism can include proof of work (PoW), proof of stake (PoS), delegated proof of stake (DPoS), Practical Byzantine Fault Tolerance (PBFT), and so on. The provable ordered transaction history is based on a plurality of on-chain transactions from one or more blockchains. The provable ordered transaction history can include historical information about transactions stored on one or more blocks (called "on-chain" transactions) within one or more blockchains. The on-chain transactions can include a type of transaction, asset information, a buy or sell price, exchange information, a timestamp, and so on. In a usage example, the historical transaction information can include a trade number, an asset identification, an exchange identification, a buy or sell price, and a time stamp. The plurality of on-chain transaction data can comprise a live data feed of the one or more blockchains. The live data feed can include cryptocurrency trading pairs, price data, transaction data, or other market data.

Embodiments include creating 112 the provable ordered transaction history. Transaction information can be read from the blockchain with a blockchain data indexer. The blockchain indexer can be a private blockchain indexer. A blockchain indexer can be a program that extracts data from a blockchain. Since the data stored on linked blocks within the blockchain can be distributed, the blockchain data indexer can search, filter, locate, etc. data within linked blocks of the blockchain. The blockchain data indexer can be based on The Graph indexing protocol. The blockchain data indexer can include a query language for application programming interfaces (APIs) such as GraphQL. The blockchain indexer can be programmed to access specific data. For example, the indexer can collect all transactions on a blockchain associated with a specific cryptocurrency trading pair, all transactions that have occurred over a timeframe, all transactions of a specific cryptocurrency over a specified volume during a time period, and so on. The provable ordered transaction history can include on-chain data and off-chain data. Off-chain data can be saved on chain by an oracle such as public distributed oracle network (described below). The extracted data can be transformed into another usable form, such as the provable ordered transaction history. The plurality of on-chain transactions included in the provable ordered transaction history can represent transactions within blocks of more than one blockchain. Separate private ordered transaction histories can be created for different blockchains. Ownership, transactions, pricing, and any other essential information regarding the tokenized asset can be validated at any time by repeating the blockchain data indexer queries.

In embodiments, the creating is based on a combined hash, wherein the combined hash is based on one or more blocks from the one or more blockchains which contain the plurality of on-chain transactions from the one or more blockchains. A hash function can be a mathematical function that takes an input string of any length and converts it to a fixed-length output string. Any change in the input string can result in a different, unrelated, hashed output string. Hash functions can be used in blockchains to validate the relationship of one data block to another. In embodiments, the provable ordered transaction history includes an open-high-low-close (OHLC) candle format, wherein the OHLC candle format includes volume. The provable ordered transaction history can consolidate open, close, high, or low trade information across the plurality of transactions extracted from the blockchain blocks that were included in the provable ordered transaction history. In a usage example, the open price can be a price associated with the first trade in the plurality of transactions, and the closing price can be a price associated with the last trade in the plurality of transactions. The high price can include the highest asset price encountered over the plurality of transactions, and the low price can include the lowest price encountered over the plurality of transactions. The volume can be a total number of tokenized assets that were transacted over the plurality of transactions. An OHLC candle format can be a data structure used to display, evaluate, analyze, and so on relevant aspects, such as open, high, or low close information, of a tokenized asset over the plurality of transactions.

In embodiments, the provable ordered transaction history includes a money flow. The money flow for any time period represented by the plurality of transactions can be calculated from various transaction data that is included in the provable ordered transaction history. For example, the money flow can include an average of the high, low, and closing price for a time period multiplied by a volume for that time period. The money flow can be included in the provable ordered transaction history. Money flows from various time periods can be compared to indicate a positive, negative, or neutral money flow. These comparisons can indicate whether interest in an asset, such as a tokenized asset, is rising or falling over the time period analyzed.

In embodiments, the provable ordered transaction history includes a liquidity. Liquidity can refer to the ability for an asset, such as a tokenized asset, to be sold without affecting future pricing of the asset. A high liquidity can indicate a stable market while a lower liquidity can indicate price instability. A liquidity for any time period represented by the plurality of transactions can be calculated from various transaction data that is included in the provable ordered transaction history. Liquidity can be calculated as a ratio. A volume of a traded asset, such as a tokenized asset, over a time period can be multiplied by a closing price. That product can be divided by a price range over that period (the high price of the period minus the low price of the period). Other calculations of liquidity can be performed.

In embodiments, the provable ordered transaction history includes a time-ordered transaction history. The transaction data associated with the tokenized asset can include a type of transaction, asset information, a buy or sell price, exchange information, a timestamp, and so on. The provable ordered transaction history can be arranged in time order. For example, a first element of the provable ordered transaction history can summarize transactions that took place on one or more blocks of a blockchain. Since each blockchain transaction includes a timestamp, a duration representing the time range in which the transactions took place can be added to the element. A second, third, and so on element can be added to the provable ordered transaction history. The net result is that the plurality of transactions included in the provable ordered transaction history can be summarized in the time order they occurred.

The flow 100 includes developing one or more decision strategies 120. A decision strategy can be used to determine whether a transaction, such as a blockchain transaction, should be considered, executed, declined, and so on. The decision strategies can be based on one or more parameters, conditions, requirements, and the like. The decision strategy can comprise a program that activates one or more action instructions for a smart contract. The decision strategy can be deployed on a public decentralized oracle network (DON). The decision strategy can initiate the smart contract on one or more blockchains and/or send action instructions to the smart contract which can execute them, resulting in at least one new blockchain transaction. Thus, a decision strategy can be used to determine whether a transaction should be considered, executed, declined, and so on. The decision strategies can be based on one or more parameters, conditions, requirements, and the like. In embodiments, the developing includes back testing 122, by a developer, the first decision strategy, wherein the back testing is based on the provable ordered transaction history. The back testing can be based on one or more techniques which can use a decision strategy for one or more hypothetical transactions to determine how well the strategy would have performed had the strategy actually been executed. The back testing can use actual on-chain data that was captured and included in the provable ordered transaction history. Thus, the back testing can include any range of time for which data has been collected.

The one or more decision strategies can be based on a trading strategy, such as a momentum trading strategy (e.g., relative strength index—RSI, moving average convergence/divergence—MACD, and so on). The one or more decision strategies comprise a program that activates one or more actions for a smart contract. A smart contract can be a self-executing agreement with predefined terms. A smart contract can be stored on a blockchain and can execute an agreement automatically when certain conditions are met. The conditions can be agreed to in advance between two parties. The conditions can comprise code on the blockchain. The conditions can be sent to the smart contract. The agreement can occur digitally. The actions for the smart contract can include buy, sell, convert, trade, exchange transactions, and the like. The actions can be performed, by the smart contract, on a blockchain with a tokenized asset. The decision strategy can initiate the smart contract on a blockchain. In embodiments, the developing is accomplished by one or more developers. The one or more developers can include an individual developer, a team of developers, etc. and can be given access to the database. The developer can use one or more programming languages for the developing such as Python, C, C++, etc. The decision strategies can be sold, rented, commissioned, etc. by the developers to one or more users.

The flow 100 includes selecting a first decision strategy within the one or more decision strategies 130. Any number of decision strategies can be developed by any number of developers and stored in the database. While one or more developers can develop the strategies, a user can select a strategy for trustless smart contract execution. In embodiments, the selecting is accomplished by a user. Any number of strategies can be selected by any number of users. The user can select a decision strategy based on a trading style, a desired return, a risk measurement, cost of the decision strategy, and so on. The selecting can be based on the back testing. The user can select a different decision strategy based on the results of the back testing. The selection can be based on choosing a decision strategy well suited to goals and planning associated with the individual. The selecting can be based on a recommendation from an expert, friend, etc. In embodiments, the selecting includes a second decision strategy and a second user.

In the flow 100, the selecting includes one or more execution parameters 134 and one or more protection parameters 136. The execution parameters can control a blockchain transaction that can be initiated by the decision strategy that was selected. The execution parameters can represent the wishes of the user as the decision strategy executes. In embodiments, the one or more execution parameters include a trade dollar limit. A trade dollar limit can restrict how large of a trade value can be initiated by the decision strategy in any one transaction. The trade dollar limit can restrict a total value of all outstanding trades initiated by the decision strategy. The trade dollar limit can be based on a physical currency, a cryptocurrency, etc. In embodiments, the one or more execution parameters include a trade quantity limit. The trade quantity limit can restrict how many tokens of a tokenized asset, such as a cryptocurrency, can be traded in a single transaction initiated by the decision strategy. The trade quantity limit can restrict a total number of tokens between all outstanding transactions initiated by the decision strategy. In embodiments, the one or more execution parameters include a cryptocurrency trading pair. A trading pair can include assets that can be traded each for the other on an exchange. The trading pair, for example Bitcoin/Ether, can establish a comparative value between two cryptocurrencies. The cryptocurrency trading pair execution parameter, selected by the user, can restrict the decision strategy to only generate blockchain transactions for a specified trading pair. In embodiments, the one or more execution parameters include a time limit. The time limit can cause expiry of any transaction initiated by the decision strategy after a certain time. At the time limit, any transaction initiated by the decision strategy can be unfilled, partially filled, or filled. The time limit can protect the user from unwittingly having more outstanding open transactions than desired.

The one or more protection parameters that were selected by the user can ensure that the transactions initiated by the decision strategy are valid, authorized, etc. The protection parameters can be used to set a number of transactions, amounts associated with transactions, etc. The one or more protection parameters can include a list of allowed exchanges. The allowed exchanges can include specific exchanges, geographic locations of the exchanges, etc. The one or more protection parameters can include a list of allowed trading pairs. A trading pair can include assets that can be traded each for the other on an exchange. A user can specify a trading pair along with the decision strategy. An unauthorized attempt can be made to alter the instructions such that another trading pair is specified. The protection parameters can prevent the unauthorized attempt. The one or more protection parameters can include a maximum position size. The maximum position size can be based on a physical currency, a cryptocurrency, etc. This can prevent an unauthorized attempt to alter a position size, which can cause outsized losses. The one or more protection parameters can include a risk score. The risk score can be based on a volatility factor associated with an asset. The volatility factor can be based on external factors such as market fluctuations, political unrest, and so on. The one or more protection parameters can include a quality of trade price information. The quality of the trade price information can be based on reputation of a source, corroboration by two or more sources, etc.

The flow 100 includes deploying the first decision strategy 140 on a public decentralized oracle network (DON). A public decentralized oracle network can be a service that connects smart contracts running on a blockchain with external data sources ("off-chain" information). The off-chain information can include any external data such as market data, sensor data, weather data, financial data, sports data, and so on. Off-chain data can be written on chain to the blockchain by the oracle. The public DON can also take in data from one or more blockchains, including transaction data related to a tokenized asset. The data received by the public DON can be validated by comparing information from multiple sources. In embodiments, the public DON is based on a consensus algorithm, wherein the DON provides, to an on-chain transaction, off-chain information. The public DON can include a human oracle. Human oracles can be responsible for researching information and its authenticity before data is sent to a smart contract. The public DON can comprise a collection of independent computers, servers, cloud servers, etc. operated by third parties that provide an operating environment for the decision strategy. The decision strategy can execute on the public DON. The one or more decision strategies are immutable. That is, parameters of the one or more decision strategies cannot be changed once deployed. Since the public DON is protected by a consensus algorithm, the execution of the decision strategy can be trusted. The one or more decision strategies can be canceled by the user so that no further blockchain transactions are initiated.

In the flow 100, the first decision strategy initiates the smart contract 142 on the one or more blockchains. Because the decision strategy executes on the public DON, it can have access to off-chain data such as market data, sensor data, financial data, and so on. The decision strategy can be based on off-chain data that can be collected by the DON. Recall that a smart contract can be a self-executing agreement stored on a blockchain which can execute an agreement automatically when certain conditions are met. The conditions can be based on the off-chain data collected by the public DON. For example, a smart contract to trade a specific cryptocurrency trading pair can be based on other off-chain data such as a level of the Dow Jones Industrial Average (DJIA), a snowstorm in Ohio, an election result, a team winning a championship, and so on. The DON can add the off-chain data to the blockchain. The off-chain data gathered from the DON can be validated by a DON validation method. The DON validation method can include consensus within the public DON. The consensus validation methods used by the DON can include delegated proof of stake (DPoS), proof of work (PoW), proof of authority (PoA), and so on. Each consensus method can leverage a collection of network members to validate data and transactions. Various reward systems can be employed to encourage accurate validation and discourage bad actors. Consensus validation can also be implemented by running the action instructions through multiple DON nodes to ensure that each node or a majority of nodes arrive at the same processing results. The DON validation methods can also be included in protection parameters.

The flow 100 includes transferring funds 150, from a blockchain wallet owned by the user to the smart contract. Funds can be transferred via a custody solution associated with the tokenized asset. The wallet can be controlled by the individual. The funds can be collected prior to execution of one or more blockchain transactions by the smart contract that was initiated by the decision strategy. Transferring funds can be a critical condition for a decision strategy, smart contract, and/or blockchain transaction to be executed. In a usage example, an individual desires to purchase $1000 worth of a cryptocurrency. Prior to executing the purchase transaction, an amount of $1000 would be transferred from the individual's wallet to the smart contract that was initiated by a decision strategy. If the transfer fails or is canceled, then the funds are not transferred, and the smart contract remains unexecuted. The funds can be converted from cash to a stablecoin, such as Tether (USDT) whose value is tied to the U.S. dollar, and stored in the blockchain wallet and the smart contract. The stablecoin can be used to initiate the trade, according to the decision strategy, instead of the cryptocurrency.

The flow 100 includes sending one or more action instructions 160, by the first decision strategy running on the public DON, to the smart contract. When the decision strategy receives data from the public DON that satisfies certain conditions specified, the decision strategy can send action instructions to the smart contract that was initiated. The action instructions can trigger a transaction to be executed by the smart contract, in accordance with directions from the decision strategy. In embodiments, the sending is responsive to one or more on-chain transactions 162. The one or more on-chain transactions can be transactions that originated from one or more blockchains. For example, the on-chain transactions can comprise one or more bitcoin trades that occur on a blockchain. The bitcoin transaction can trigger the sending. In other embodiments, the sending is responsive to off-chain data 164. Recall that the public DON can collect off-chain data. The sending can be based on data gathered by the public DON. For example, a severe weather condition in a region that produces crops could be collected by the public DON and used by the decision strategy to send action instructions to a smart contract to sell or buy crop futures positions. In a usage example, a regional conflict could affect trade routes for goods, triggering a decision strategy to place action instructions to take advantage of related marketplace changes.

In embodiments, the one or more action instructions are based on the one or more execution parameters. For example, an action instruction can be based on the most recent trading price of bitcoin. Recall that a trade dollar limit can be an execution parameter. If the most recent bitcoin action instruction, if executed, would result in a trade dollar limit above what was specified by the user, the action instruction can be withheld or canceled. The action instructions can be based on any execution parameter specified by the user and associated with the decision strategy. In embodiments, each action instruction within the one or more action instructions comprises a decentralized finance (deFi) transaction. A deFi transaction can be a financial transaction, between two parties, that executes on a blockchain. A deFi transaction does not require a third party, such as a bank, to authorize the transaction, but can be controlled by smart contracts, as described above.

The flow 100 includes executing the one or more action instructions 170, by the smart contract. The executing results in at least one new blockchain transaction. The executing the one or more blockchain transactions can include buying, selling, trading, converting, lending, borrowing, exchanging, etc. one or more tokenized assets. The executing one or more blockchain transactions can generate one or more blockchain blocks, where the one or more blockchain blocks can be added to one or more blockchains. The executing is trustless. That is, throughout the process, no third party is required to verify the blockchain data once the executing is complete. The decision strategy is immutable, and cannot be changed once deployed. The decision strategy can be cancelled by the user who initiates it. The public DON is validated by a consensus algorithm and is trusted to provide correct data, and the smart contract execution of the action instructions can be verified with protection parameters. The provable ordered transaction history, on which the decision strategy can be back tested, can be verified. Thus, disclosures enable trustless transactions between anonymous parties.

The user can select multiple decision strategies based on different scenarios related to the tokenized asset. For example, the user can select a decision strategy to respond to rising oil prices, a second decision strategy for falling oil prices, and a third decision strategy for stable oil prices over a three- or six-month time span. Each decision strategy can be deployed on the public DON in the same way as the first decision strategy, and thus can take off-chain data such as shipping prices, weather conditions, political stability in oil-producing countries, and so on into account. The one or more decision strategies are immutable once deployed and blockchain transactions that are initiated from the one or more decision strategies become part of the blockchain. The one or more decision strategies can be canceled by the user so that no further blockchain transactions are initiated, but the transactions on the blockchain cannot be reversed. In embodiments, the selecting includes a second decision strategy. In embodiments, the deploying, the sending, and the executing include the second decision strategy.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
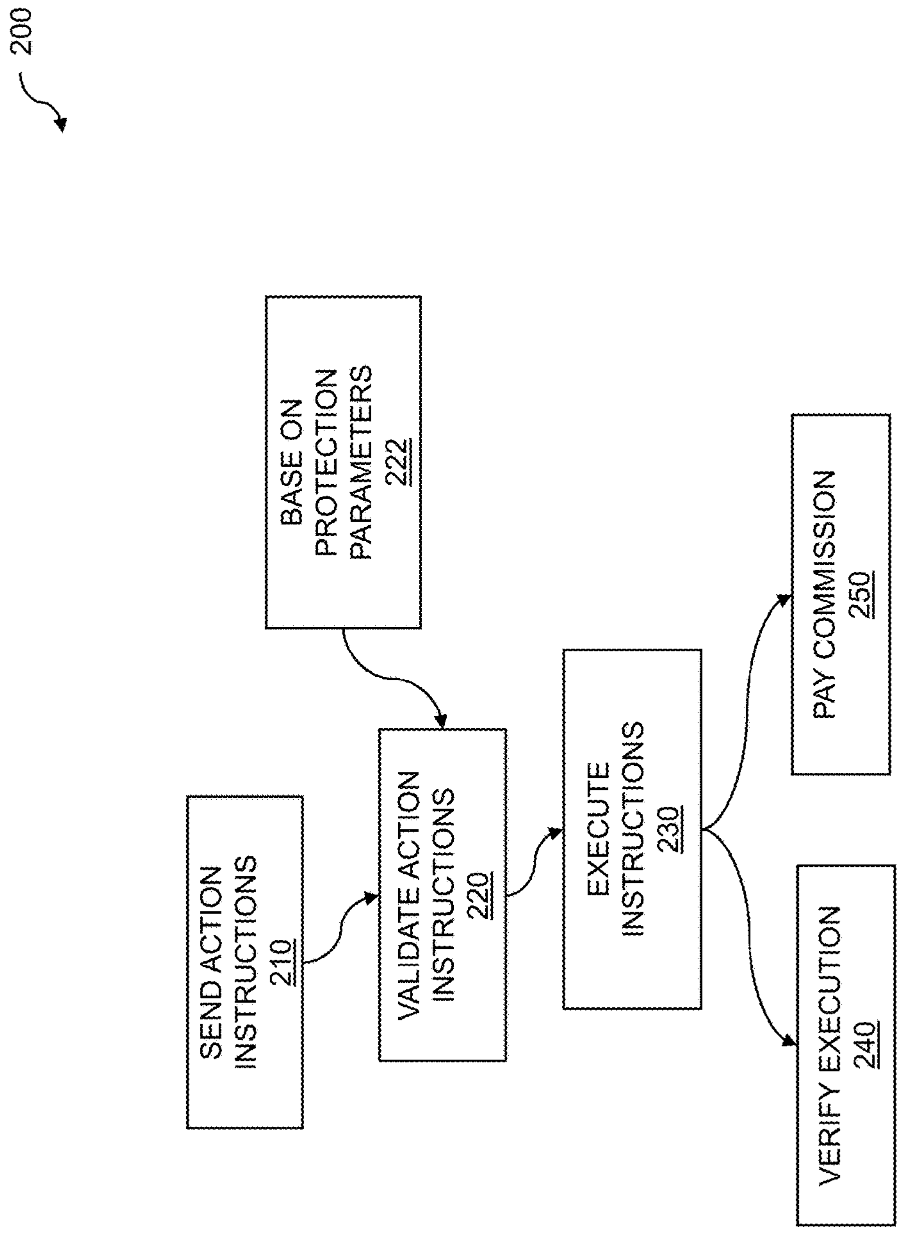
FIG. 2 is a flow diagram for enabling blockchain transactions.

FIG. 2 is a flow diagram for enabling blockchain transactions. Blockchain transactions are enabled by trustless smart contract execution based on provable ordered transaction history. Programming access is provided to a database which includes a provable ordered transaction history of a tokenized asset. The provable ordered transaction history is based on transactions from one or more blockchains. One or more decision strategies, which comprise a program that activates one or more actions for a smart contract, are developed. A first decision strategy, one or more execution parameters, and one or more protection parameters are selected. The first decision strategy, which initiates a smart contract, is deployed on a public oracle network. One or more action instructions are sent to the smart contract. The one or more action instructions are executed by the smart contract, resulting in at least one new blockchain transaction.

The flow 200 includes sending one or more action instructions 210, by the first decision strategy running on the public DON, to the smart contract. As described above and throughout, when the decision strategy receives data from the public DON that satisfies certain conditions specified, the decision strategy can send action instructions to the smart contract that was initiated. The action instructions can trigger a transaction to be executed by the smart contract, in accordance with directions from the decision strategy. In embodiments, the sending is responsive to one or more on-chain transactions. The one or more on-chain transactions can be transactions that originated from one or more blockchains. For example, the on-chain transactions can comprise one or more bitcoin trades that occur on a blockchain. The bitcoin transaction can trigger the sending. In other embodiments, the sending is responsive to off-chain data. Recall that the public DON can collect off-chain data. The sending can be based on data gathered by the public DON. For example, a severe weather condition in a region that produces crops could be collected by the public DON and used by the decision strategy to send action instructions to a smart contract to sell or buy crop futures positions. In a usage example, a regional conflict could affect trade routes for goods, triggering a decision strategy to place action instructions to take advantage of related marketplace changes.

In the flow 200, the sending includes validating, by the smart contract, the one or more action instructions 220, wherein the validating is based on the one or more protection parameters 222. The validating can include checking the action instructions before they are executed by the smart contract. The validation process can use off-chain data gathered by the public DON to act as a check against external regulations and policies that limit or prohibit any trades included in the action instructions. The validating can help protect against cybersecurity attacks, unauthorized transactions (such as unpaid transactions), and so on. The one or more protection parameters can include a list of allowed exchanges. The allowed exchanges can include specific exchanges, geographic locations of the exchanges, etc. The allowed exchanges can include a list of allowed blockchains. The one or more protection parameters can include a maximum position size. The maximum position size can be based on a physical currency, a cryptocurrency, etc. This can protect the user of the decision strategy from larger trading losses than anticipated. The maximum position size can be exceeded due to a security breach. For example, a hacker who gains access to a user account may attempt to initiate a number of transactions. A maximum position size protection parameter can halt future transactions after a position reaches a certain size, a portfolio reaches a certain size, and so on. The one or more protection parameters can include a risk score. The risk score can be based on a volatility factor associated with an asset. The volatility factor can be based on external factors such as market fluctuations, political unrest, and so on. The risk factor can be based on a risk metric such as the Sharpe ratio, the Sortino ratio, and so on. When the decision strategy detects that a trade would result in a higher or a lower ratio than specified in the protection parameters, it can withhold sending the action instructions. The one or more protection parameters can include a quality of trade price information. The quality of the trade price information can be based on reputation of a source, corroboration by two or more sources, etc. This can prevent transactions from occurring based on faulty data. The quality of trade price information protection parameter can also prevent the decision strategy, public DON, smart contract, and so on from using data that has been altered by a hacker.

The flow 200 includes executing the one or more action instructions 230, by the smart contract, wherein the executing results in at least one new blockchain transaction, and wherein the executing is trustless. As described above, the executing can include buying, selling, trading, converting, lending, borrowing, exchanging, etc. one or more tokenized assets. The executing one or more blockchain transactions can generate one or more blockchain blocks, where the one or more blockchain blocks can be added to one or more blockchains. The executing is trustless. That is, the one or more blockchain transactions occur in a trustless fashion. That is, no third party is required to verify the blockchain when the one or more blockchain transactions are executed.

The flow 200 includes verifying that the at least one new blockchain transaction was executed 240 according to the first decision strategy. The verifying can include comparing the executed blockchain transactions to the conditions of the decision strategy to ensure that the conditions of the strategy were met. For example, a decision strategy can require five shares of a tokenized asset to be sold when the price of the tokenized asset reaches $100.00. A smart contract can be initiated based on those instructions, execution parameters, protection parameters, and so on. Blockchain transactions can be read to determine what the price of a tokenized asset was at the time the sell order for the related shares was placed. Since blockchain transactions that were executed from the smart contracts are also saved on chain, the verifying can include these as well as a full history of previous blockchain transactions. The blockchain transactions can be used to verify the number of shares sold, the prices for which the shares sold, and so on. The blockchain transactions can include off-chain data saved on chain by the public DON. These conditions, if relevant to the transaction, can also be verified. All of the conditions of the decision strategy can be compared to the blockchain transactions that were executed as a result of the smart contract to verify whether they complied with the decision strategy.

New blockchain transactions related to a tokenized asset can be located and collected by a blockchain data indexer as they occur. The blockchain transaction data can be transformed and stored in the provable ordered transaction data database. The transaction data from the provable ordered transaction data database can be sent to the DON and analyzed to determine whether decision strategy conditions have been met. Updating the provable ordered transaction database can also enable developers to continue to update and refine decision strategies related to various tokenized assets as market conditions change and more users become involved with buying and selling the tokenized assets.

The verifying can include testing the accuracy of a deployed version of a smart contract in comparison to a smart contract from which the deployed version is derived. The determining accuracy can include receiving a source code representing a smart contract and using a compiler to generate a bytecode version of the smart contract. The compiled smart contract byte code can be included in a deployed version of the smart contract. A byte code associated with the deployed smart contract can be obtained. The smart contract source code can be recompiled to generate a byte code. The byte codes associated with the smart contract and for the deployed smart contract can be compared. The comparison can determine whether the smart codes are substantially identical, as they should be, or not. The byte codes being substantially identical can indicate that the deployed contract is unaltered when compared to the smart contract.

In the flow 200, the executing includes paying, by the user, a commission 250 to the one or more developers. Recall that one or more developers can develop one or more decision strategies. Recall also that a user can select a decision strategy to deploy on a public DON. The user can comprise a client, a customer, a potential purchaser, and so on. The selecting can be based on one or more models such as a pay-to-play model; a performance fee based model; a subscription service, rental, or license; and the like. The one or more decision strategies can be associated with the same asset, a collection of assets (e.g., purchase of an entire set or collection), a plurality of individual assets, etc. The individual can select a first decision strategy from the one or more decision strategies. One or more additional decision strategies can be selected, purchased, rented, licensed, etc. by the user from any number of developers. The payment can be in any form, including cryptocurrency.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
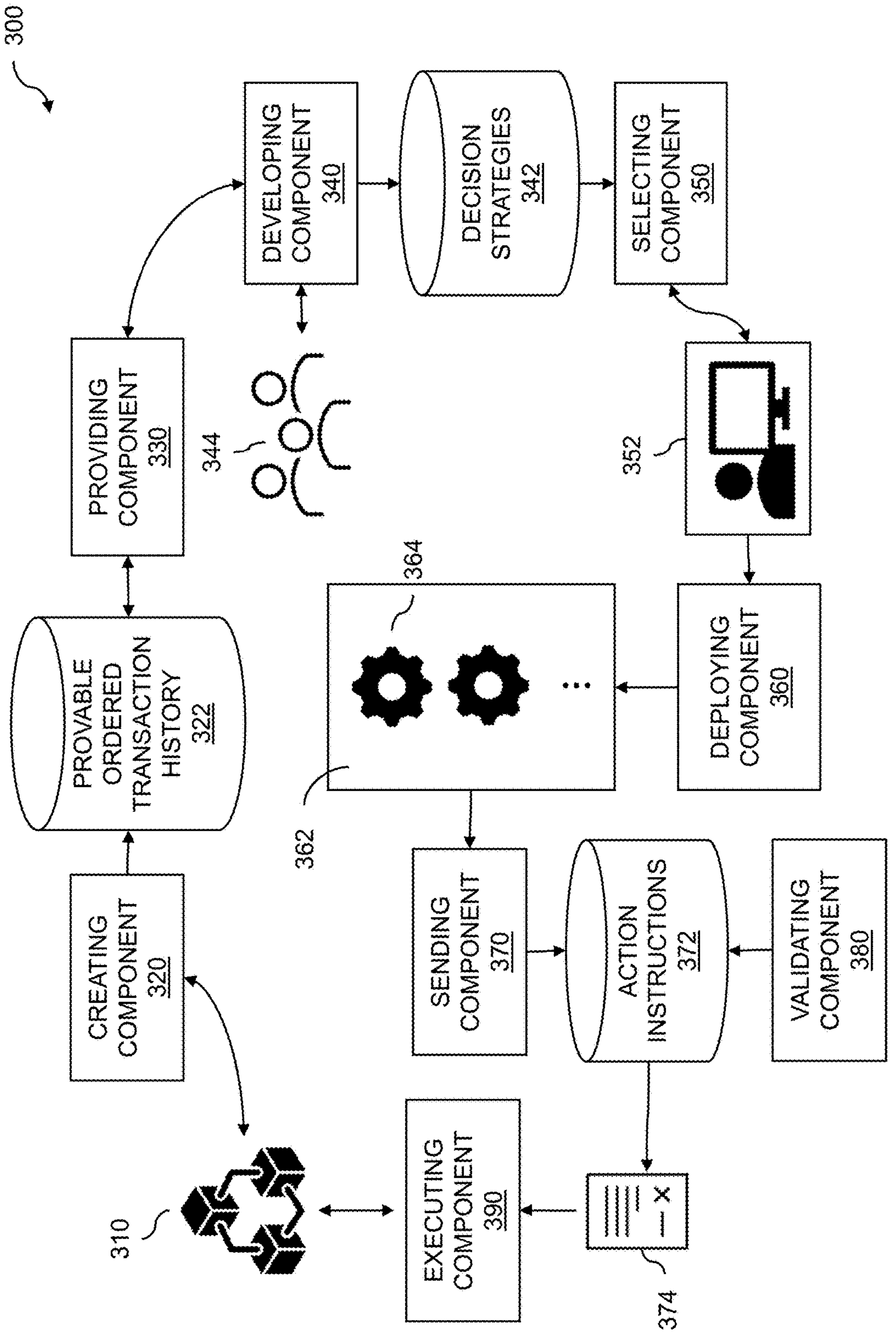
FIG. 3 is an infographic for trustless execution on a distributed oracle network.

FIG. 3 is an infographic 300 of trustless execution on a distributed oracle network. The infographic 300 includes one or more blockchains 310. The blockchains can include a public blockchain, a private blockchain, a proprietary blockchain, etc. The infographic includes a creating component 320. Embodiments include creating the provable ordered transaction history. Transaction data can be collected from the blockchains through use of a blockchain indexer which can extract data from a blockchain. The indexer can collect all transactions on a blockchain associated with a specific cryptocurrency trading pair, all transactions that have occurred over a timeframe, all transactions of a specific cryptocurrency over a specified volume during a time period, and so on. The blockchain indexer can transform the extracted data into another usable form, such as the provable ordered transaction history. Separate private ordered transaction histories can be created for different blockchains.

The infographic 300 includes provable ordered transaction history of a tokenized asset 322. The provable ordered transaction history is based on a plurality of on-chain transactions from one or more blockchains. In embodiments, the provable ordered transaction history includes a time-ordered transaction history. The transaction data associated with the tokenized asset can include a type of transaction, asset information, a buy or sell price, exchange information, a timestamp, and so on. The provable ordered transaction history can be arranged in time order. This can make it easy to reconstruct transactions that occurred on the blockchain at any time. The reconstruction can also include relevant data that was available at the time any transaction was executed. The provable ordered transaction history can include on-chain and off-chain data. In embodiments, the provable ordered transaction history includes an open-high-low-close (OHLC) candle format, wherein the OHLC candle format includes volume. The provable ordered transaction history can consolidate open, close, high, or low trade information across the plurality of transactions extracted from the blockchain blocks that were included in the provable ordered transaction history. The provable ordered transaction history can include the results of calculations of the transaction data that was saved. In embodiments, the provable ordered transaction history includes a money flow. In other embodiments, the provable ordered transaction history includes a liquidity.

The flow 300 includes a providing component 330. Embodiments include providing programming access to a database, wherein the database includes a provable ordered transaction history of a tokenized asset, wherein the provable ordered transaction history is based on a plurality of on-chain transactions from one or more blockchains. The providing access can be based on using a code, a password, two-factor authentication (2FA), an access control list (ACL), and so on. The flow 300 includes a developing component 340. Embodiments include developing one or more decision strategies, wherein each decision strategy in the one or more decision strategies is based on the provable ordered transaction history, wherein the one or more decision strategies comprise a program that activates one or more actions for a smart contract. A decision strategy 342 can comprise a program that activates one or more action instructions for a smart contract. The decision strategy can be deployed on a public decentralized oracle network (DON). The decision strategy can be a program that initiates the smart contract on one or more blockchains and/or sends action instructions to the smart contract which can execute them, resulting in at least one new blockchain transaction. In embodiments, the developing is accomplished by one or more developers 344. The one or more developers can include an individual developer, a team of developers, and the like. The developer can attain programming access through an interface such as an application programming interface (API). The developing can be based on one or more programming languages such as Python, C, C++, etc.

A smart contract can be a self-executing agreement with predefined terms. A smart contract can be stored on a blockchain and can execute an agreement automatically when certain conditions are met. The conditions can be agreed to in advance between two parties. The conditions can comprise code on the blockchain. The agreement can occur digitally. The actions for the smart contract can include buy, sell, convert, trade, exchange transactions, and the like. The actions can be performed, by the smart contract, on a blockchain with a tokenized asset. The decision strategy can initiate the smart contract on a blockchain.

In embodiments, the developing includes back testing, by a developer, the first decision strategy, wherein the back testing is based on the provable ordered transaction history. The back testing can be based on one or more techniques which can use a decision strategy for one or more hypothetical transactions to determine how well the strategy would have performed had the strategy actually been executed. The back testing can use actual on-chain data that was captured and included in the provable ordered transaction history. Thus, the back testing can include any range of time for which data has been collected.

The infographic includes a selecting component 350. Embodiments include selecting a first decision strategy within the one or more decision strategies, wherein the selecting includes one or more execution parameters and one or more protection parameters. In embodiments, the selecting is accomplished by a user 352. The user can select a decision strategy based on a trading style, a desired return, a risk measurement, cost of the decision strategy, and so on. The user can select a decision strategy based on back testing results generated by a developer.

The infographic 300 includes a deploying component 360. Embodiments include deploying the first decision strategy on a public decentralized oracle network (DON), wherein the first decision strategy initiates the smart contract on the one or more blockchains. A DON 362 can be a service that connects smart contracts running on a blockchain with external data sources ("off-chain" information). The off-chain information can include any external data such as market data, sensor data, weather data, financial data, sports data, and so on. Off-chain data can be written on chain to the blockchain by the oracle. The public DON can comprise a collection of independent computers 364, servers, cloud servers, etc., operated by third parties, that provide an operating environment for the decision strategy. In embodiments, the public DON is based on a consensus algorithm, wherein the DON provides, to an on-chain transaction, off-chain information. The consensus validation methods used by the DON can include delegated proof of stake (DPoS), proof of work (PoW), Proof of Authority (PoA), and so on. Each consensus method can leverage a collection of network members to validate data and transactions. Various reward systems can be employed to encourage accurate validation and discourage bad actors. The decision strategy can execute on the public DON. Since the public DON is protected by a consensus algorithm, the execution of the decision strategy can be trusted. The one or more decision strategies are immutable. That is, the one or more decision strategies cannot be changed once deployed. The one or more decision strategies can be canceled by the user so that no further blockchain transactions are initiated.

The infographic 300 includes a sending component 370. Embodiments include sending one or more action instructions, by the first decision strategy running on the public DON, to the smart contract. When the decision strategy receives data from the public DON that satisfies certain conditions specified, the decision strategy can send action instructions 372 to the smart contract 374 that was initiated. The action instructions can trigger a transaction to be executed 390 by the smart contract, in accordance with directions from the decision strategy. In embodiments, the sending is responsive to the one or more on-chain transactions. The one or more on-chain transactions can be transactions that originated from one or more blockchains. For example, the on-chain transactions can comprise one or more bitcoin trades that occur on a blockchain. The bitcoin transaction can trigger the sending. In other embodiments, the sending is responsive to off-chain data. Recall that the public DON can collect off-chain data. The sending can be based on data gathered by the public DON. For example, a severe weather condition in a region that produces crops could be collected by the public DON and used by the decision strategy to send action instructions to a smart contract to sell or buy crop futures positions. In a usage example, a regional conflict could affect trade routes for goods, triggering a decision strategy to place action instructions to take advantage of related marketplace changes.

In embodiments, the one or more action instructions are based on the one or more execution parameters. Execution parameters can control the conditions under which the action instruction is to be executed by the smart contract. For example, if a bitcoin action instruction, such as a buy instruction, would result in a trade dollar limit above what was specified by the user, the action instruction can instruct the smart contract to issue the buy instruction only when the price of bitcoin lowers to the point that the entire trade is below the trade dollar limit.

The infographic includes a validating component 380. In embodiments, the sending includes validating, by the smart contract, the one or more action instructions, wherein the validating is based on the one or more protection parameters. Prior to execution, the action instructions can be validated. The validating can use off-chain data gathered by the public DON to act as a check against external regulations and policies that limit or prohibit any trades included in the action instructions. The validating can help protect against cybersecurity attacks, unauthorized transactions (such as unpaid transactions), and so on. The one or more protection parameters can include a list of allowed exchanges. The allowed exchanges can include specific exchanges, geographic locations of the exchanges, etc. The one or more protection parameters can include a list of allowed trading pairs. A trading pair can include assets that can be traded each for the other on an exchange. A user can specify a trading pair along with the decision strategy. An unauthorized attempt can be made to alter the instructions such that another trading pair is specified. The protection parameters can prevent the unauthorized attempt. The one or more protection parameters can include a maximum position size. The maximum position size can be based on a physical currency, a cryptocurrency, etc. This can prevent an unauthorized attempt to alter a position size which can cause outsized losses. The one or more protection parameters can include a risk score. The risk score can be based on a volatility factor associated with an asset. The volatility factor can be based on external factors such as market fluctuations, political unrest, and so on. The one or more protection parameters can include a quality of trade price information. The quality of the trade price information can be based on the reputation of a source, corroboration by two or more sources, etc.

Figure 4:
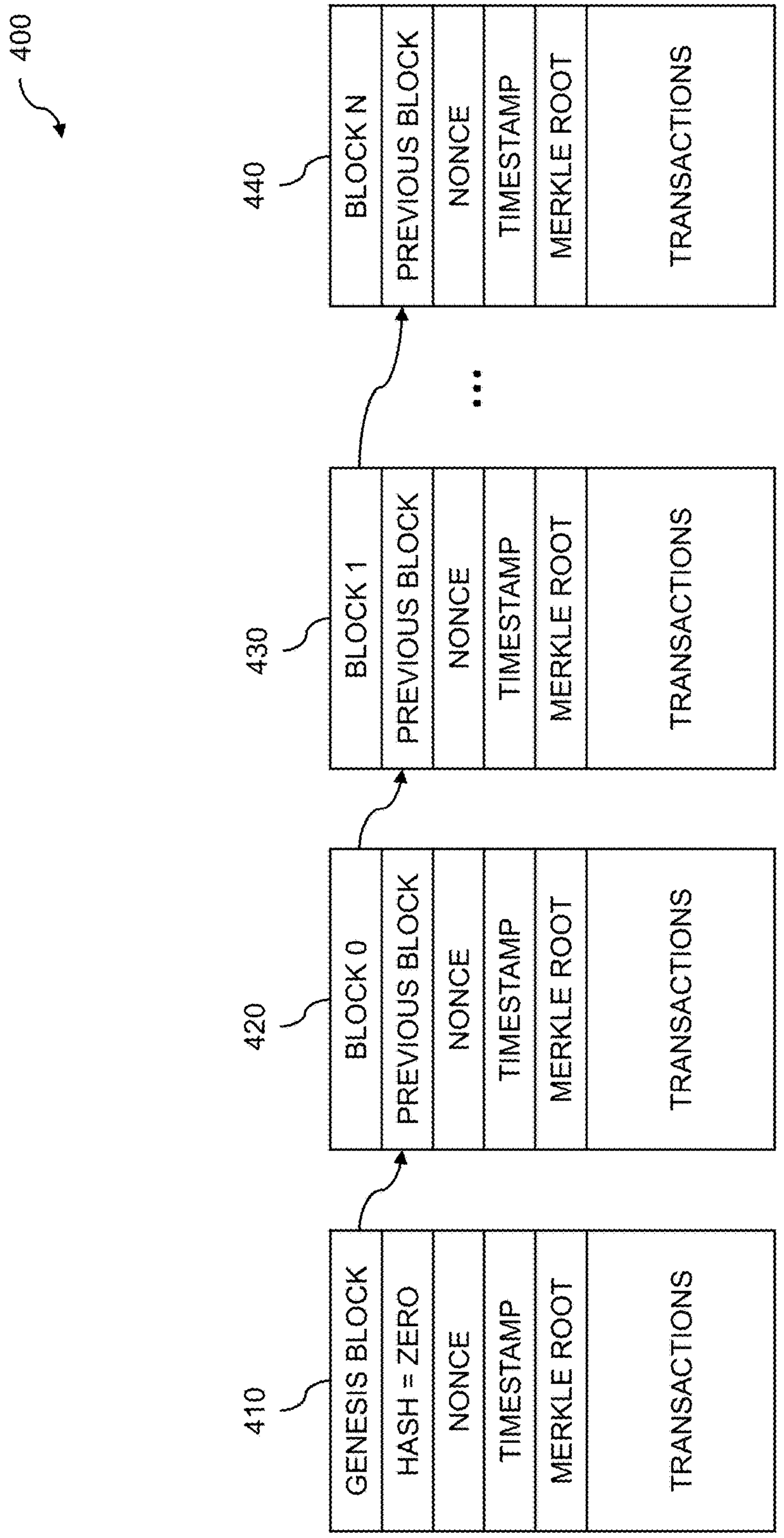
FIG. 4 is a block diagram of a blockchain.

FIG. 4 is a block diagram of a blockchain. Smart contract execution can be enabled by one or more blockchain transactions. The smart contracts can be associated with one or more purchases and sales of tokenized assets. A tokenized asset can be represented by a token based on a blockchain, where the blockchain represents ownership of a digital asset, a physical asset, and so on. The blockchain can be enabled by a distributed digital ledger. All transactions associated with the tokenized asset, such as purchase of or sale of the tokenized asset, can be recorded in the blockchain. These transactions can comprise a transaction history. The transaction history can be used to demonstrate that a seller has the right to sell a tokenized asset, that the buyer of the asset has received the asset, and so on. Proof of Data Possession (PDP) and Proof of Retrievability (PoR) cryptographic protocols can be used to verify that the blockchain data is accurate, complete, and available. These checks can be used to prove the reliability of the blockchain data in the transaction history. The blockchain enables history-based trustless smart contract execution. Programming access is provided to a database which includes a provable ordered transaction history of a tokenized asset. The provable ordered transaction history is based on transactions from one or more blockchains. One or more decision strategies, which comprise a program that activates one or more actions for a smart contract, are developed. A first decision strategy, one or more execution parameters, and one or more protection parameters are selected. The first decision strategy, which initiates a smart contract, is deployed on a public oracle network. One or more action instructions are sent to the smart contract. The one or more action instructions are executed by the smart contract, resulting in at least one new blockchain transaction.

A blockchain, such as one or more blockchains described herein, can include one or more records. In embodiments, the one or more blockchain records can include one or more blocks and/or transactions. A blockchain block can include one or more transactions. In order for the transactions to be included in the blockchain block, the transactions are determined to be valid transactions. The blocks can be organized based on a tree configuration such as a Merkle tree. The Merkle tree can be built by hashing one or more transactions. The hashed transactions are further encoded. For a given block within a blockchain, the block includes a hash calculated from a previous block in the blockchain. The previous block can be the immediately preceding block in the blockchain. Blocks within the blockchain are "linked" by a hash generated from the previous block. New blocks can be added to the head of the blockchain. Preceding blocks can remain unchanged in order to verify the validity of the blockchain. The addition of a new block is based on a hash generated from the preceding block. The addition of the previous block was based on a hash from its preceding block, which was based on a hash of its preceding block, etc. Since the hash of the new block is based on an iteration of hashes from the preceding blocks, validity of the blockchain can be confirmed. In a usage example, the hashes of preceding blocks can be recalculated and compared to hashes stored within blocks. If the computed hashes match the stored hashes, then the blocks within the blockchain can be considered valid. If the computed hashes and the stored hashes differ, then the blockchain can be considered corrupted, tampered with, or otherwise invalid.

The block diagram 400 includes an example blockchain 400. A blockchain can include a genesis block, such as block 410. The genesis block can be a basis block from which the blockchain grows. The blockchain can grow as transactions associated with the blockchain are executed. The blockchain can include blocks in addition to the genesis block, such as block 0 420, block 1 430, block N 440, and so on. Each block within the blockchain can include key information about the block, information based on a previous block, and so on. Each block within the blockchain can include one or more transactions. Each block can include a hash value based on a previous block, a nonce, a timestamp, and a Merkle root, in addition to the one or more transactions. Other information can be included. The information can be different for various blockchains. The hash value for a given block is generated from the hash value obtained from the previous block in the blockchain. For the genesis block, the hash equals zero. The nonce is a onetime value that is generated from the data within the block, the hash value from the previous block, a hash for the current block, and other information. The nonce can indicate whether data in the block has changed, because any change in the block information results in a different nonce value. The timestamp can indicate when the block was created, last accessed, changed, and so on. The Merkle root can be calculated by determining a hash of the hashes associated with the blocks of the blockchain. The Merkle root can indicate that the blocks of the blockchain are complete, undamaged, and unaltered. The transactions can include transactions such as blockchain transactions. The transactions can include off-chain data gathered by a public DON. The transactions can include secured transactions, where the securing of the transactions can be based on protection parameters. The protection parameters can be included in one or more decision strategies.

Figure 5:
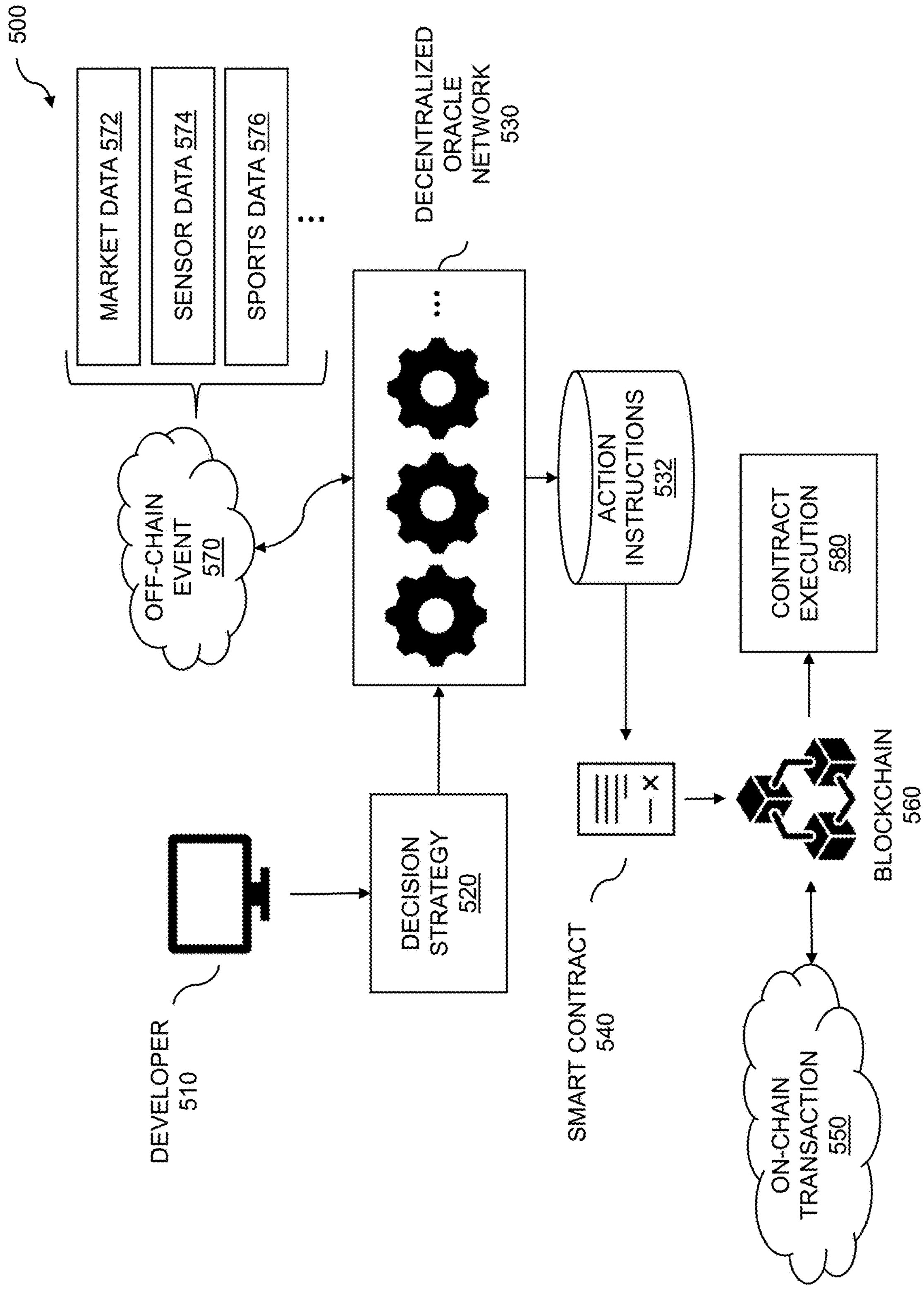
FIG. 5 is an infographic of smart contract execution on a blockchain.

FIG. 5 is an infographic 500 of smart contract execution on a blockchain. As described above and throughout, programming access can be provided to a database, which includes a provable ordered transaction history of a tokenized asset. The provable ordered transaction history is based on a plurality of on-chain transactions from one or more blockchains. The infographic 500 can include a developer 510. Programming access can be provided to a developer 510. The developer can include an individual developer, a team of developers, and the like. The developer can attain programming access through an interface such as an application programming interface (API).

The infographic 500 includes a decision strategy 520. Embodiments include developing one or more decision strategies, wherein each decision strategy in the one or more decision strategies is based on the provable ordered transaction history, wherein the one or more decision strategies comprise a program that activates one or more actions 532 for a smart contract. A decision strategy can be used to determine whether a transaction should be considered, executed, declined, and so on. The decision strategies can be based on one or more parameters, conditions, requirements, and the like. A user can select a decision strategy within the one or more decision strategies. The first decision strategy can be deployed on a public decentralized oracle network (DON) 530. The public DON initiates the smart contract 540 on the one or more blockchains. One or more action instructions 532 can be sent by the first decision strategy deployed on the public DON to the smart contract. In embodiments, the sending is responsive to one or more on-chain transactions 550. The one or more on-chain transactions can be transactions that executed and/or originated from one or more blockchains 560. For example, the on-chain transactions can comprise one or more bitcoin trades that occur on a blockchain. In a usage example, an action instruction can be sent by the decision strategy deployed on the public DON when a Bitcoin transaction occurs on a blockchain over a certain price.

Recall that the public DON can collect off-chain data. Recall also that the public DON can comprise a collection of independent computers, servers, cloud servers, etc. operated by third parties protected by a consensus algorithm. The consensus algorithm can include delegated proof of stake (DPoS), proof of work (PoW), Proof of Authority (PoA), and so on. Each consensus method can leverage a collection of network members to validate data and transactions. Various reward systems can be employed to encourage accurate validation and discourage bad actors. Since the public DON is protected by a consensus algorithm, the execution of the decision strategy and the collection of off-chain data can be trusted. In embodiments, the sending is responsive to off-chain data 570. For example, a severe weather condition in a region that produces crops could be collected by the public DON and used by the decision strategy to send action instructions to a smart contract to sell or buy crop futures positions. In a usage example, a regional conflict could affect trade routes for goods, triggering a decision strategy to place action instructions to take advantage of related marketplace changes. The off-chain data can include market data 572, sensor data 574, sports data 576, weather information, news events, and so on. The parameters, conditions, requirements, etc. that were selected along with the first decision strategy can be based on the on-chain transactions and/or off-chain data such as described above.

The infographic includes executing the one or more action instructions 580, by the smart contract, wherein the executing results in at least one new blockchain transaction, wherein the executing is trustless. The executing can include buying, selling, trading, converting, lending, borrowing, exchanging, etc. one or more tokenized assets. The executing is trustless. That is, throughout the process, no third party is required to verify the blockchain data once the executing is complete. The decision strategy is immutable once deployed. The decision strategy can be cancelled by the user who initiates it. The public DON is validated by a consensus algorithm and is trusted to provide correct data, and the smart contract execution of the action instructions can be verified with protection parameters. The provable ordered transaction history, on which the decision strategy can be back tested, can be verified. Thus, disclosures enable trustless transactions between anonymous parties.

Figure 6:
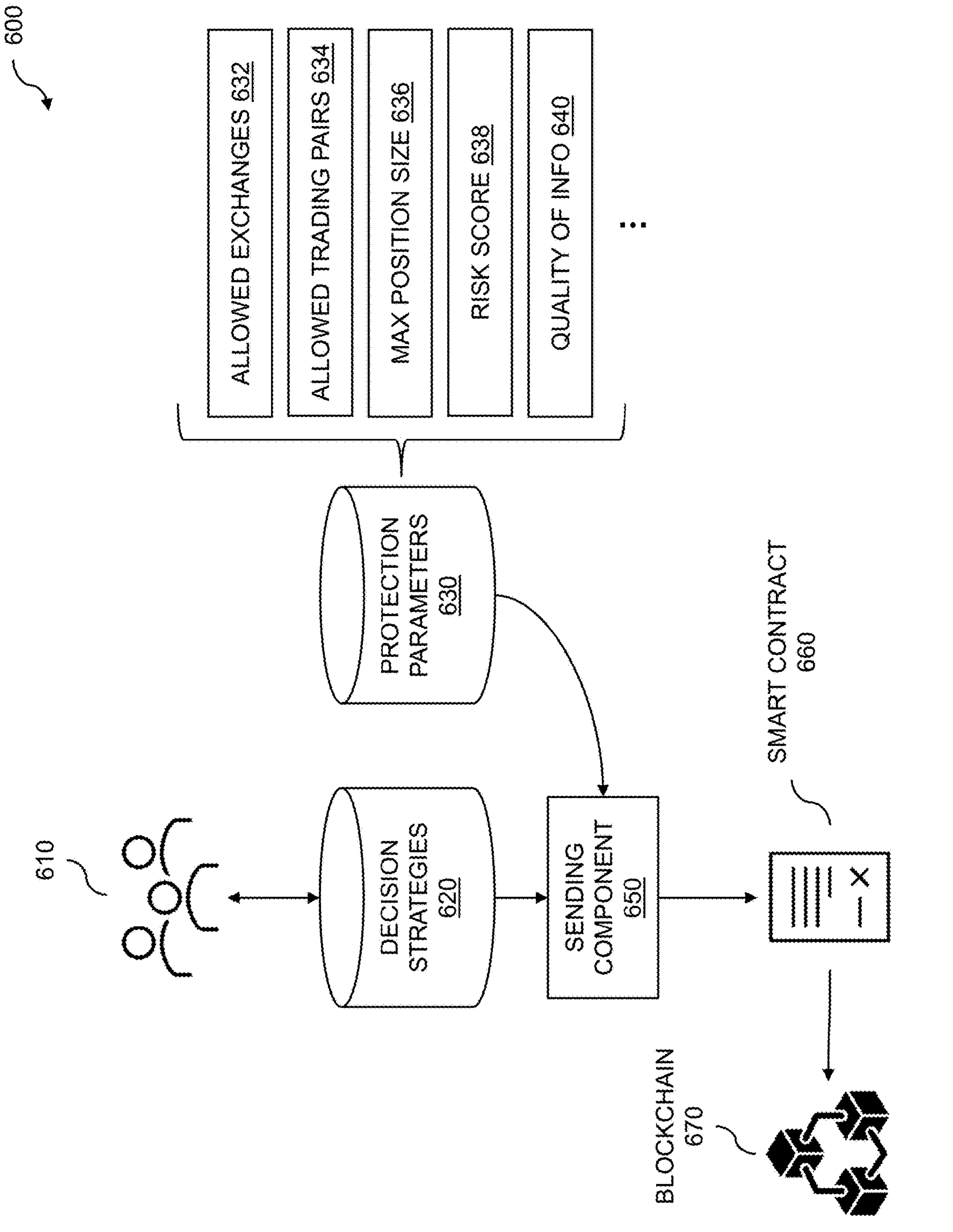
FIG. 6 is an infographic for validating a blockchain transaction.

FIG. 6 is an infographic 600 for validating a blockchain transaction. Multiple protection layers can be used to protect the validity of the blockchain transactions stemming from a decision strategy. As described above and throughout, one or more developers 610 can develop one or more decision strategies 620. A user can select a decision strategy, one or more execution parameters, and one or more protection parameters 630. The decision strategy can be deployed on a public DON which can send 650 action instructions to a smart contract 660 in response to off-chain or on-chain data from one or more blockchains. The smart contract can execute the action instructions resulting in a new blockchain 670 transaction.

The execution parameters can control a blockchain transaction that can be initiated by the decision strategy that was selected and deployed. The execution parameters can represent the wishes of the user as the decision strategy executes. In embodiments, the one or more execution parameters include a trade dollar limit. In embodiments, the one or more execution parameters include a trade quantity limit. In embodiments, the one or more execution parameters include a crypto currency trading pair. In embodiments, the one or more execution parameters include a time limit. Other execution parameters are possible to control the trade parameters desired by the user.

The action instructions can be validated. The validating is based on the one or more protection parameters. The one or more protection parameters 630 that were selected by the user can ensure that the transactions initiated by the decision strategy are valid, authorized, etc. The protection parameters can be used to set a number of transactions, amounts associated with transactions, etc. The one or more protection parameters can include a list of allowed exchanges 632. The allowed exchanges can include specific exchanges, geographic locations of the exchanges, etc. The one or more protection parameters can include a list of allowed trading pairs 634. A trading pair can include assets that can be traded each for the other on an exchange. A user can specify a trading pair along with the decision strategy. An unauthorized attempt can be made to alter the instructions such that another trading pair is specified. The protection parameters can prevent the unauthorized attempt. The one or more protection parameters can include a maximum position size 636. The maximum position size can be based on a physical currency, a cryptocurrency, etc. This can prevent an unauthorized attempt to alter a position size which can cause outsized losses. The one or more protection parameters can include a risk score 638. The risk score can be based on a volatility factor associated with an asset. The volatility factor can be based on external factors such as market fluctuations, political unrest, and so on. The one or more protection parameters can include a quality of trade price information 640. The quality of the trade price information can be based on reputation of a source, corroboration by two or more sources, etc. Additional protection parameters are possible.

Additional protections can be included to validate the transactions. As explained above and throughout, a public DON can host the decision strategy which can rely on on-chain or off-chain data to send action instructions. The validation process can use off-chain data from the DON to act as a check against external regulations and policies that limit or prohibit any trades included in the action instructions. Consensus validation can also be used by running the action instructions through multiple DON nodes to ensure that each node arrives at the same processing results. The validation process also helps protect against cybersecurity attacks. In other embodiments, the validation method can include consensus within the DON. The consensus validation methods used by the DON can include various algorithms and processes, such as delegated proof of stake (DPoS), proof of work (PoW), Proof of Authority (PoA), and so on. Each consensus method leverages a collection of network members to validate data and transactions.

Further protections are enabled since the one or more decision strategies are immutable. That is, the one or more decision strategies cannot be changed once deployed to the public DON. The decision strategies can be canceled by the individual so that no further blockchain transactions are initiated. With these protections, the execution of the one or more action instructions, by the smart contract is trustless. That is, no third party is required to verify the blockchain when the one or more blockchain transactions are executed.

Figure 7:
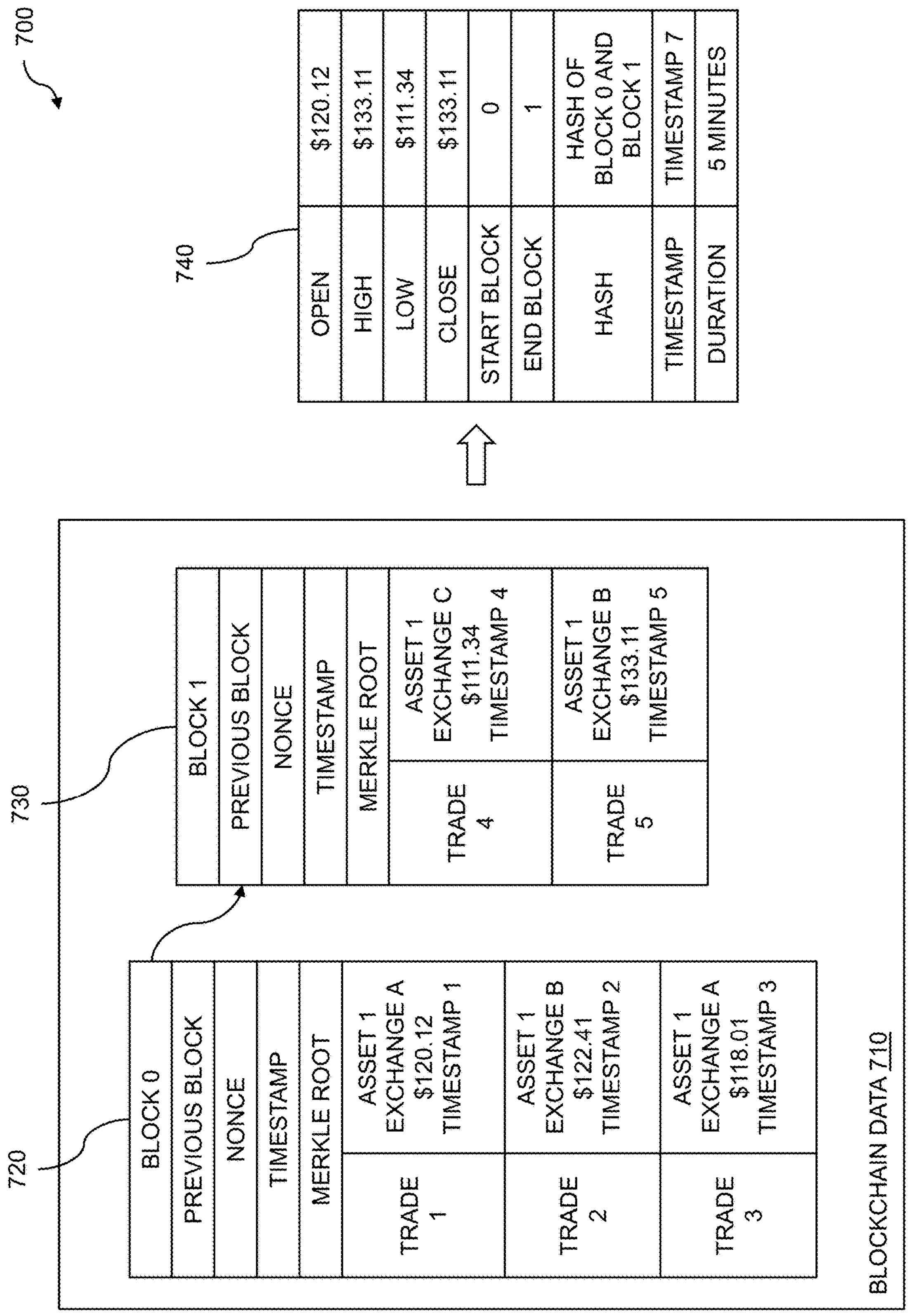
FIG. 7 is a block diagram of creating a provable ordered transaction history.

FIG. 7 is a block diagram 700 of creating a provable ordered transaction history. As described above and throughout, a decision strategy is based on a provable ordered transaction history. Information can be collected from one or more blockchains, on a plurality of transaction data. The collecting information can be based on a blockchain data indexer. The collecting information can be completed for a tokenized asset. The plurality of transaction data for the tokenized asset can be transformed. The transforming can produce the provable ordered transaction history. The provable ordered transaction history can be created based on a combined hash, which is based on one or more blocks from the one or more blockchains. The provable ordered transaction history can include a money flow, a liquidity, a time-ordered transaction history, and so on. The provable ordered transaction history can be stored to a database. The provable ordered transaction history can include history information from one or more blocks from the one or more blockchains which contain the plurality of transaction data that was transformed.

The diagram 700 can include blockchain data 710. The example blockchain includes two blocks, block 0 720 and block 1 730. Block 0 can be a genesis block. Block 1 can be a successor block to block 0. Each block in the blockchain can include a hash based on a previous block. If block 0 is the genesis block for the blockchain 710, then the hash value is zero. The previous block hash associated with block 1 can be based on the hash associated with block 1. Each block in the blockchain can include a nonce. The nonce can be a onetime value that is generated based on a variety of information. The nonce can be generated based on the data within the block, the hash value from the previous block, a hash for the current block, and other information. Each block within the blockchain can include a timestamp. The timestamp can include a time based on Universal Time (e.g., GMT or UTC), local time, a time reference, etc. Each block in the blockchain can include a Merkle root. The Merkle root can be calculated based on determining a hash value. The hash can be based on determining a hash of the hashes associated with the blocks of the blockchain.

Each block within the blockchain can include data specific to a blockchain. In the example, the data can include transaction data such as trade data. The data associated with block 0 can include trade information associated with an asset such as asset 1, which can be a tokenized asset. The trade data can be associated with trading the asset on one or more exchanges. The trade data can include trade 1 of asset 1 on exchange A, trade 2 of asset 1 on exchange B, and trade 3 of asset 1 on exchange A. The trade data can further include a price, a timestamp, and so on. Further data can be associated with block 1. The data associated with block 1 can include trade information associated with an asset such as asset 1. The trade data can include trade 4 of asset 1 on exchange C, and trade 5 of asset 1 on exchange B. The trade data associated with block 1 can further include a price, a timestamp, and so on.

The collecting information from the blockchain can be based on a blockchain oracle such as a public distributed oracle network (DON), private oracle, and so on. The oracle enables a connection between the blockchain and external data sources. The external data sources can include market data, sensor data, sports data, political data, weather data, and so on. The oracle can enable execution of one or more smart contracts based on external inputs. The external inputs can include real-world inputs. The real-world inputs can further include data, commands, parameters such as execution parameters or protection parameters, and so on. The information collected by the blockchain oracle can be analyzed to produce an ordered transaction history. The provable ordered transaction history can be stored to a database.

The block diagram 700 includes a provable ordered transaction history 740. The provable ordered transaction history can show key information associated with transactions corresponding to an asset. The provable ordered transaction history can include data such as open, high, low, and close (OHLC) data; a start block identification such as a number; an end block identification; a hash, which can be a combined hash of the blockchain blocks associated with the provable ordered transaction history; a timestamp; and a duration, which can be a total time taken by the one or more blockchain blocks included. Throughout the duration, the price of asset 1 changed. The provable ordered transaction history can show highest and lowest prices associated with the asset within the duration. The provable ordered transaction history can be used by one or more decision strategies to determine whether a smart contract should be executed.

Figure 8:
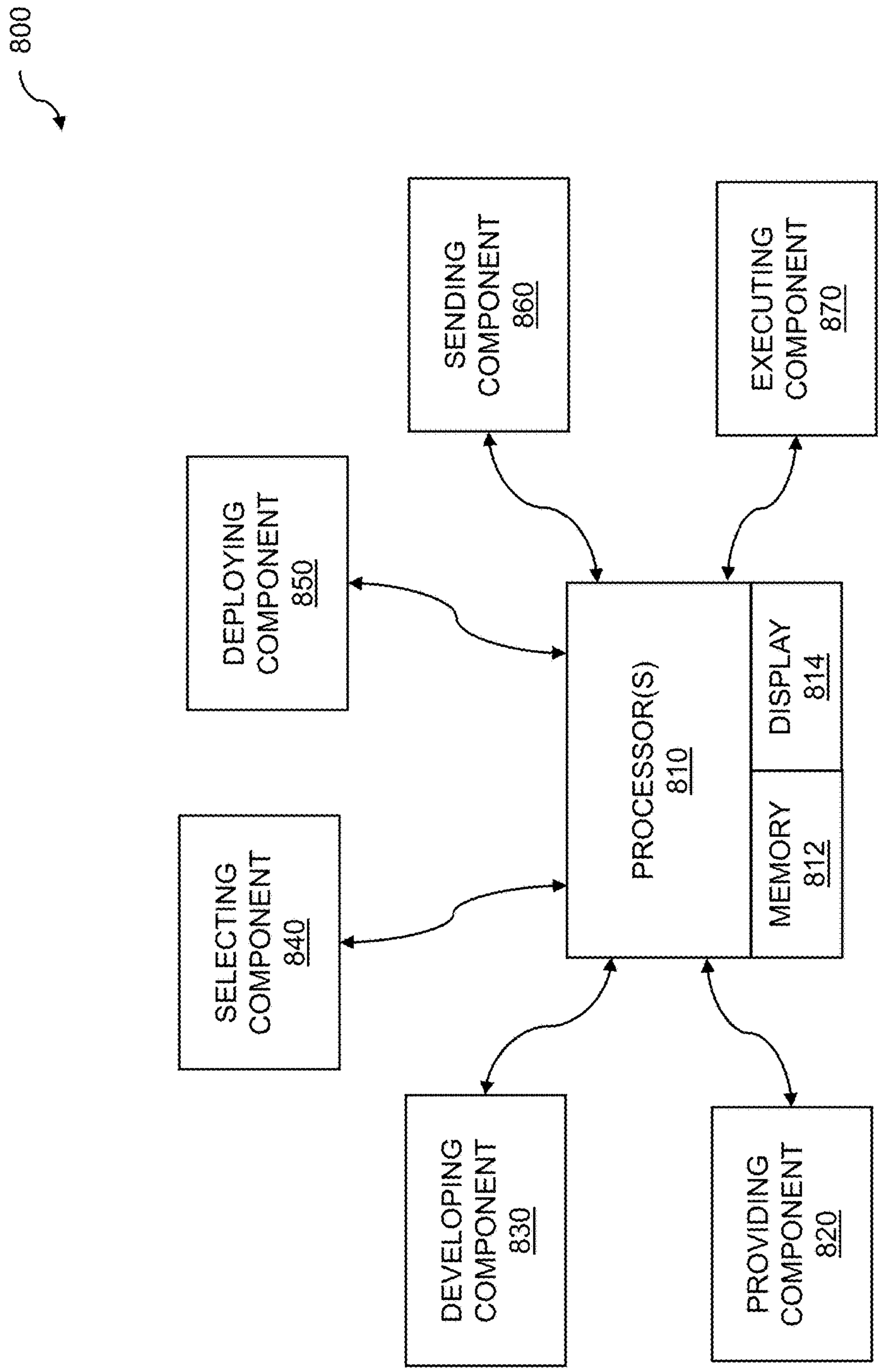
FIG. 8 is a system diagram for trustless smart contract execution based on provable ordered transaction history data.

FIG. 8 is a system diagram 800 for trustless smart contract execution based on provable ordered transaction history. The system 800 can include one or more processors 810 attached to a memory 812 which stores instructions. The system 800 can include a display 814 coupled to the one or more processors 810 for displaying data, database information, programming details, blockchain information, provable ordered transaction histories, intermediate steps, decision strategies, execution parameters, protection parameters, instructions, and so on. In embodiments, one or more processors are attached to the memory where the one or more processors, when executing the instructions which are stored, are configured to: provide programming access to a database, wherein the database includes a provable ordered transaction history of a tokenized asset, wherein the provable ordered transaction history is based on a plurality of on-chain transactions from one or more blockchains; develop one or more decision strategies, wherein each decision strategy in the one or more decision strategies is based on the provable ordered transaction history, wherein the one or more decision strategies comprise a program that activates one or more actions for a smart contract; select a first decision strategy within the one or more decision strategies, wherein the selecting includes one or more execution parameters and one or more protection parameters; deploy the first decision strategy on a public decentralized oracle network (DON), wherein the first decision strategy initiates the smart contract on the one or more blockchains; send one or more action instructions, by the first decision strategy running on the public DON, to the smart contract; and execute the one or more action instructions, by the smart contract, wherein the executing results in at least one new blockchain transaction, wherein the executing is trustless.

The system 800 can include a providing component 820. The providing component can include functions and instructions for providing programming access to a database, wherein the database includes a provable ordered transaction history of a tokenized asset, wherein the provable ordered transaction history is based on a plurality of on-chain transactions from one or more blockchains. The database can include a secure database, a controlled access database, and so on. The database can include a central database, a distributed database, etc. Programming access can be provided to a developer. The developer can include an individual developer, a team of developers, and the like. The developer can attain programming access through an interface such as an application programming interface (API). The provable ordered transaction history is based on a plurality of on-chain transactions from one or more blockchains. The one or more blockchains can include a public blockchain, a private blockchain, and so on. The provable ordered transaction history can include historical information about transactions stored on one or more blocks (called "on-chain" transactions) within one or more blockchains.

The system 800 can include a developing component 830. The developing component can include functions and instructions for developing one or more decision strategies, wherein each decision strategy in the one or more decision strategies is based on the provable ordered transaction history, wherein the one or more decision strategies comprise a program that activates one or more actions for a smart contract. A decision strategy can be used to determine whether a transaction, such as a blockchain transaction, should be considered, executed, declined, and so on. The decision strategies can be based on one or more execution parameters, protection parameters, conditions, requirements, and the like. The decision strategy can comprise a program that activates one or more action instructions for a smart contract. The decision strategy can be deployed on a public decentralized oracle network (DON). The decision strategy can initiate the smart contract on one or more blockchains and/or send action instructions to the smart contract which can execute them, resulting in at least one new blockchain transaction. A smart contract can be a self-executing agreement with predefined terms. A smart contract can be stored on a blockchain and can execute an agreement automatically when certain conditions are met. The conditions can comprise code on the blockchain. In embodiments, the developing is accomplished by one or more developers. The developer can include an individual developer, a team of developers, etc. and can be given access to the database. The developers can use one or more programming languages for the developing such as Python, C, C++, etc.

The system 800 can include a selecting component 840. The selecting component can include functions and instructions for selecting a first decision strategy within the one or more decision strategies, wherein the selecting includes one or more execution parameters and one or more protection parameters. In embodiments, the selecting is accomplished by a user. The user can select a decision strategy based on a trading style, a desired return, a risk measurement, cost of the decision strategy, and so on. The execution parameters can control a blockchain transaction that can be initiated by the decision strategy that was selected. The execution parameters can represent the wishes of the user as the decision strategy executes. In embodiments, the one or more execution parameters include a trade dollar limit. In other embodiments, the one or more execution parameters include a trade quantity limit. In further embodiments, the one or more execution parameters include a cryptocurrency trading pair. In some embodiments, the one or more execution parameters include a time limit. The one or more protection parameters that were selected by the user can ensure that the transactions initiated by the decision strategy are valid, authorized, etc. The protection parameters can be used to set a number of transactions, amounts associated with transactions, etc. The one or more protection parameters can include a list of allowed exchanges, a list of allowed trading pairs, a maximum position size, a risk score, a quality of trade price information, and so on.

The system 800 can include a deploying component 850. The deploying component can include functions and instructions for deploying the first decision strategy on a public decentralized oracle network (DON), wherein the first decision strategy initiates the smart contract on the one or more blockchains. A public decentralized oracle network can be a service that connects smart contracts running on a blockchain with external data sources ("off-chain" information). The off-chain information can include any external data such as market data, sensor data, weather data, financial data, sports data, and so on. Off-chain data can be written on-chain to the blockchain by the oracle. The public DON can also take in data from one or more blockchains, including transaction data related to a tokenized asset. The data received by the public DON can be validated by comparing information from multiple sources. In embodiments, the public DON is based on a consensus algorithm, wherein the DON provides, to an on-chain transaction, off-chain information. The public DON can comprise a collection of independent computers, servers, cloud servers, etc. operated by third parties that provide an operating environment for the decision strategy. The decision strategy can execute on the public DON. The one or more decision strategies are immutable.

The system 800 can include a sending component 860. The sending component can include functions and instructions for sending one or more action instructions, by the first decision strategy running on the public DON, to the smart contract. When the decision strategy receives data from the public DON that satisfies certain conditions specified, the decision strategy can send action instructions to the smart contract that was initiated. The action instructions can trigger a transaction to be executed by the smart contract, in accordance with directions from the decision strategy. In embodiments, the sending is responsive to one or more on-chain transactions. In other embodiments, the sending is responsive to off-chain data. In embodiments, the one or more action instructions are based on the one or more execution parameters. For example, an action instruction can be based on the most recent trading price of bitcoin. Recall that a trade dollar limit can be an execution parameter. If the most recent bitcoin action instruction, if executed, would result in a trade dollar limit above what was specified by the user, the action instruction can be withheld or canceled. The action instructions can be based on any execution parameter specified by the user and associated with the decision strategy. In embodiments, each action instruction within the one or more action instructions comprises a decentralized finance (deFi) transaction. A deFi transaction can be a financial transaction between two parties that executes on a blockchain. A deFi transaction does not require a third party, such as a bank, to authorize the transaction, but can be controlled by smart contracts, as described above.

The system 800 can include an executing component 870. The executing component can include functions and instructions for executing the one or more action instructions, by the smart contract, wherein the executing results in at least one new blockchain transaction, wherein the executing is trustless. The executing the one or more blockchain transactions can include buying, selling, trading, converting, lending, borrowing, exchanging, etc. one or more tokenized assets. No third party is required to verify the blockchain data once the executing is complete. The decision strategy is immutable, except by the user who initiates it. The public DON is validated by a consensus algorithm and is trusted to provide correct data, and the smart contract execution of the action instructions can be verified with protection parameters. The provable ordered transaction history, on which the decision strategy can be back tested, can be verified. In embodiments, the deploying, transferring, sending, and executing can include a second decision strategy. The user can select multiple decision strategies based on different scenarios related to the tokenized asset.

The system 800 can include a computer program product embodied in a non-transitory computer readable medium for parallel processing, the computer program product comprising code which causes one or more processors to perform operations of: providing programming access to a database, wherein the database includes a provable ordered transaction history of a tokenized asset, wherein the provable ordered transaction history is based on a plurality of on-chain transactions from one or more blockchains; developing one or more decision strategies, wherein each decision strategy in the one or more decision strategies is based on the provable ordered transaction history, wherein the one or more decision strategies comprise a program that activates one or more actions for a smart contract; selecting a first decision strategy within the one or more decision strategies, wherein the selecting includes one or more execution parameters and one or more protection parameters; deploying the first decision strategy on a public decentralized oracle network (DON), wherein the first decision strategy initiates the smart contract on the one or more blockchains; sending one or more action instructions, by the first decision strategy running on the public DON, to the smart contract; and executing the one or more action instructions, by the smart contract, wherein the executing results in at least one new blockchain transaction, wherein the executing is trustless.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data analysis comprising:

providing programming access to a database, wherein the database includes a provable ordered transaction history of a tokenized asset, wherein the provable ordered transaction history is based on a plurality of on-chain transactions from one or more blockchains;

developing one or more decision strategies, wherein each decision strategy in the one or more decision strategies is based on the provable ordered transaction history, wherein the one or more decision strategies comprise a program that activates one or more actions for a smart contract;

selecting a first decision strategy within the one or more decision strategies, wherein the selecting includes one or more execution parameters and one or more protection parameters;

deploying the first decision strategy on a public decentralized oracle network (DON), wherein the first decision strategy initiates the smart contract on the one or more blockchains;

sending one or more action instructions, by the first decision strategy running on the public DON, to the smart contract, wherein the sending includes validating, by the smart contract, the one or more action instructions, wherein the validating is based on the one or more protection parameters; and executing the one or more action instructions, by the smart contract, wherein the executing results in at least one new blockchain transaction, and wherein the executing is trustless.

2. The method of claim 1 wherein the public DON is based on a consensus algorithm, wherein the DON provides, to an on-chain transaction, off-chain information.

3. The method of claim 1 further comprising creating the provable ordered transaction history.

4. The method of claim 3 wherein the creating is based on a combined hash, wherein the combined hash is based on one or more blocks from the one or more blockchains which contain the plurality of on-chain transactions from the one or more blockchains.

5. The method of claim 3 wherein the provable ordered transaction history includes an open-high-low-close (OHLC) candle format, wherein the OHLC candle format includes volume.

6. The method of claim 3 wherein the provable ordered transaction history includes a money flow.

7. The method of claim 3 wherein the provable ordered transaction history includes a liquidity.

8. The method of claim 3 wherein the provable ordered transaction history includes a time-ordered transaction history.

9. The method of claim 1 wherein each action instruction within the one or more action instructions comprises a decentralized finance (deFi) transaction.

10. The method of claim 1 wherein the one or more action instructions are based on the one or more execution parameters.

11. The method of claim 10 wherein the one or more execution parameters include a trade dollar limit.

12. The method of claim 10 wherein the one or more execution parameters include a trade quantity limit.

13. The method of claim 10 wherein the one or more execution parameters include a crypto currency trading pair.

14. The method of claim 10 wherein the one or more execution parameters include a time limit.

15. The method of claim 1 wherein the sending is responsive to one or more on-chain transactions.

16. The method of claim 1 wherein the sending is responsive to off-chain data.

17. The method of claim 1 wherein the developing is accomplished by one or more developers.

18. The method of claim 17 wherein the selecting is accomplished by a user.

19. The method of claim 18 further comprising transferring funds, from a blockchain wallet owned by the user, to the smart contract.

20. The method of claim 19 wherein the executing includes paying, by the user, a commission to the one or more developers.

21. The method of claim 18 wherein the selecting includes a second decision strategy and a second user.

22. The method of claim 21 wherein the deploying, the sending, and the executing include the second decision strategy.

23. The method of claim 1 further comprising verifying that the at least one new blockchain transaction was executed according to the first decision strategy.

24. The method of claim 1 wherein the developing includes back testing, by a developer, the first decision strategy, wherein the back testing is based on the provable ordered transaction history.

25. A computer program product embodied in a non-transitory computer readable medium for data analysis, the computer program product comprising code which causes one or more processors to perform operations of:
- providing programming access to a database, wherein the database includes a provable ordered transaction history of a tokenized asset, wherein the provable ordered transaction history is based on a plurality of on-chain transactions from one or more blockchains;
- developing one or more decision strategies, wherein each decision strategy in the one or more decision strategies is based on the provable ordered transaction history, wherein the one or more decision strategies comprise a program that activates one or more actions for a smart contract;
- selecting a first decision strategy within the one or more decision strategies, wherein the selecting includes one or more execution parameters and one or more protection parameters;
- deploying the first decision strategy on a public decentralized oracle network (DON), wherein the first decision strategy initiates the smart contract on the one or more blockchains;
- sending one or more action instructions, by the first decision strategy running on the DON, to the smart contract, wherein the sending includes validating, by the smart contract, the one or more action instructions, wherein the validating is based on the one or more protection parameters; and
- executing the one or more action instructions, by the smart contract, wherein the executing results in at least one new blockchain transaction, and wherein the executing is trustless.

26. A computer system for data analysis comprising:
- a memory which stores instructions;
- one or more processors attached to the memory wherein the one or more processors, when executing the instructions which are stored, are configured to:
  - provide programming access to a database, wherein the database includes a provable ordered transaction history of a tokenized asset, wherein the provable ordered transaction history is based on a plurality of on-chain transactions from one or more blockchains;
  - develop one or more decision strategies, wherein each decision strategy in the one or more decision strategies is based on the provable ordered transaction history, wherein the one or more decision strategies comprise a program that activates one or more actions for a smart contract;
  - select a first decision strategy within the one or more decision strategies, wherein the selecting includes one or more execution parameters and one or more protection parameters;
  - deploy the first decision strategy on a public decentralized oracle network (DON), wherein the first decision strategy initiates the smart contract on the one or more blockchains;
  - send one or more action instructions, by the first decision strategy running on the DON, to the smart contract, wherein the sending includes validating, by the smart contract, the one or more action instructions, wherein the validating is based on the one or more protection parameters; and
  - execute the one or more action instructions, by the smart contract, wherein the executing results in at least one new blockchain transaction, and wherein the executing is trustless.

* * * * *